INVENTORS:
Charles V. Corn
BY James DeLay
Newton, Hopkins & Jones
ATTORNEYS

INVENTORS:
Charles V. Corn
BY James DeLay
Newton, Hopkins & Jones
ATTORNEYS

INVENTORS:
Charles V. Corn
BY James DeLay

Newton, Hopkins & Jones
ATTORNEYS

United States Patent Office 3,197,809
Patented Aug. 3, 1965

3,197,809
CHICKEN PICKING MACHINE
Charles Vernon Corn and James De Lay, Gainesville, Ga., assignors to Gainesville Machine Company, Inc., Gainesville, Ga., a corporation of Georgia
Filed Aug. 20, 1963, Ser. No. 303,284
8 Claims. (Cl. 17—11.1)

This invention relates to chicken picking machines and more particularly to a machine for removing the feathers from a chicken or other fowl with a plurality of fingers extending toward the chicken or other fowl and rotating about axes of rotation perpendicular to the direction of travel of the chicken or other fowl.

Rotary drum type chicken picking machines are well known in the art. These previous chicken picking machines customarily employ a plurality of rotary drums having a plurality of flexible rubber picking fingers extending from the periphery thereof to accomplish the removal of feathers from a chicken suspended head down from a shackle carried by a conveyor belt. These previous machines have in most cases effectively removed feathers from most portions of the body of a chicken. However, several different machines, each having specially arranged drums have frequently been necessary to completely accomplish the removal of feathers from all portions of a chicken or other fowl. This is because previous chicken picking machines using a plurality of rotary drums to remove feathers from most portions of a chicken's body often do not completely remove the feathers from the hocks, shoulders and neck of a chicken.

The invention described herein will remove feathers from all portions of a chicken's body in a completely satisfactory manner. Those portions of a chicken's body from which it has previously been difficult to completely remove feathers using rotary drums are completely cleaned of feathers by the invention.

The invention has a plurality of flexible rubber picking fingers which extend from circular plates into the path of travel of a chicken or other fowl through the machine. The plurality of flexible rubber picking fingers are rotated about axes of rotation perpendicular to the direction of travel of the chicken or fowl through the machine and they are rotated in such a manner that the body of the chicken or fowl is engaged on both sides by fingers moving in the same direction as its direction of travel through the machine and by fingers moving in a direction opposite to its direction of travel through the machine.

The rotation of the plurality of flexible rubber picking fingers about axes of rotation perpendicular to the direction of travel of the chicken or of the fowl through the machine results in circular paths of picking finger motion and causes each flexible picking finger to have a component of force when it strikes the body of the chicken, or other fowl which is along the arc of a circle and a component of force which is radial because of centrifugal force. It is by using a plurality of flexible rubber picking fingers rotating about axes of rotation perpendicular to the path of motion of the chicken or other fowl that the body of a chicken or other fowl is completely cleaned of all feathers by the invention.

These and other features and advantages of the invention will be more clearly understood from the following detailed description and the accompanying drawings in which like characters of reference designate corresponding parts in all figures and in which.

Figure 1:
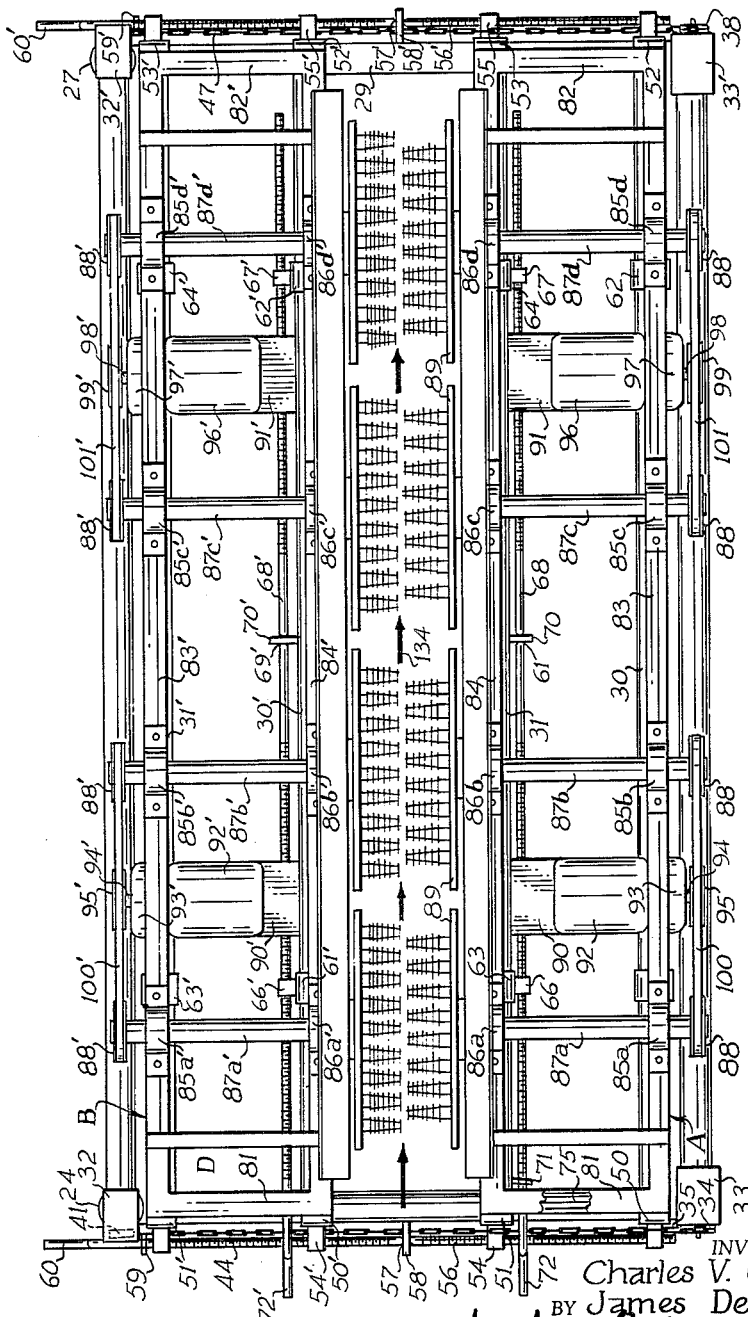
FIG. 1 is a top plan view of the chicken picking machine showing the two picking frames extending parallel to each other.

These figures and the following detailed description disclose a preferred specific embodiment of the invention but the invention is not limited to the details disclosed since it may be embodied in other equivalent forms.

This invention is best understood as comprising a right picking frame generally indicated by the letter A, a left picking frame generally indicated by the letter B, and a main frame generally indicated by the letter C. The main frame C supports the right frame A and left frame B in positions parallel to each other and the main frame C has vertical posts 20, 21, 22 and 23. A collar 24 is slidably positioned on the post 20, a collar 25 is slidably positioned on the post 21, a collar 26 is slidably positioned on the post 22, and a collar 27 is slidably positioned on the post 23. A first transverse member 28 extends horizontally between the collar 24 and the collar 25 and a second transverse member 29 extends horizontally between the collar 26 and the collar 27.

The first transverse member 28 is extended through a block 50, a block 51, a block 50' and a block 51' and the second transverse member 29 is extended through a block 52, a block 53, a block 52' and a block 53'. A first longitudinal member 30 extends horizontally between the block 50 and the block 52 and a second longitudinal member 31 extends horizontally between the block 51 and the block 53. Similarly, a third longitudinal member 30' extends horizontally between the block 50' and the block 52' and a fourth longitudinal member 31' extends horizontally between the block 51' and the block 53'.

The collars 24, 25, 26 and 27, the transverse members 28 and 29 and the longitudinal members 30, 30', 31 and 31' form a carriage generally indicated by the letter D which is vertically adjustable by sliding the collars 24, 25, 26, and 27 along the lengths of the posts 20, 21, 22 and 23. A pad 32 is fixedly attached to the upper end of the post 20 and and a pad 32' is fixedly attached to the upper end of the post 23.

A windlass 33 is fixedly attached to the upper end of the post 21 and a windlass 33' is fixedly attached to the upper end of the post 22. The windlass 33 and the windlass 33' are provided with the customary pawl and ratchet arrangement and a chain 35 on the pulley 34 of the windlass 33 is fixedly attached to an eyelet 36 extending from the collar 25. Similarly, a chain 37 on the pulley 38 of the windlass 33' is fixedly attached to an eyelet 39 extending from the collar 26. When the windlass 33 is operated in the customary manner, the collar 25 is raised or lowered along the length of the post 21 and when the windlass 33' is operated in the customary manner, the collar 26 is raised or lowered along the length of the post 22.

A pulley 40 is fixedly mounted on the collar 25, a pulley 41 is fixedly mounted on the collar 24, a pulley 42 is fixedly mounted on the collar 26 and a pulley 43 is fixedly mounted on the collar 27. A first levelling chain 44 extends from an eyelet 46 fixedly positioned at the lower end of the post 21 and over the pulley 40, thence substantially parallel to the first transverse member 28 and under the pulley 41, and thence to a hook 46' extending below the pad 32. Similarly, a second levelling chain 47 extends from an eyelet 48 fixedly positioned at the lower end of the post 22 and over the pulley 42, thence substantially parallel to the second transverse member 29 and under the pulley 43, and thence to a hook 49 extending below the pad 32'.

The first levelling chain 44 results in the collar 24 being raised and lowered along the length of post 20 when the collar 25 is raised and lowered along the length of the post 21 by the action of the windlass 33. Similarly, the second levelling chain 47 results in the collar 27 being raised and lowered along the length of the post 23 when the collar 26 is raised and lowered along the length of the post 22 by the action of the windlass 33'. Thus, when the windlass 33 is operated, that end of the carriage D supported by the posts 20 and 21 is raised and lowered and when the windlass 33' is operated, that end of the carriage D supported by the posts 22 and 23 is raised or lowered. This carriage D motion resulting from the operation of the windlass 33 and the windlass 33' is used to adjust the vertical position of the picking frames A and B supported by the main frame C.

The right picking frame A and the left picking frame B are supported parallel to each other between the first transverse member 28 and the second transverse member 29 by extending the first longitudinal member 30 through a block 61' and a block 62' fixedly attached to one side of the picking frame A, by extending the second longitudinal member 31 through a block 63 and a block 64 fixedly attached to the second side of the picking frame A, by extending the third longitudinal member 30' through a block 61' and a block 62' fixedly attached to one side of the picking frame B, and by extending the fourth longitudinal member 31' through a block 63' and a block 64' fixedly attached to the second side of the picking frame B. The blocks 50, 50', 51 and 51' are slidably movable along the length of the first transverse member 28 and the blocks 52, 52', 53, and 53' are slidably movable along the length of the second transverse member 29. Similarly, the blocks 61 and 62 are slidably movable along the first longitudinal member 30, the blocks 63 and 64 are slidably movable along the second longitudinal member 31, the blocks 61' and 62' are slidably movable along the third longitudinal member 30', and the blocks 63' and 64' are slidably movable along the length of the fourth longitudinal member 31'.

Thus, the picking frames A and B are laterally movable with respect to each other along the transverse members 28 and 29 and longitudinally movable with respect to each other along the longitudinal members 30, 30', 31, and 31'. Lateral motion of the picking frames A and B is provided by a lateral positioning mechanism comprising a tab 54 extending from the block 51, a tab 54' extending from the block 50', a tab 55 extending from the block 53 and tab 55' extending from the block 52'; a two segment screw 56 extending generally parallel to the first transverse member 28 through the tabs 54 and 54'; and a two segment screw 56' extending parallel to the second transverse member 29 through the tabs 55 and 55'. The two segments of the screws 56 and 56' are threaded with threads of opposite rotation.

The screw 56 has a scored portion 57 between its two segments and this scored portion 57 of the screw 56 extends through a bracket 58 fixedly attached to the mid-length of the first transverse member 28 so as to prevent lateral motion of the screw 56. Similarly, the screw 56' has a scored portion 57' between its two segments and this scored position 57' of the screw 56' extends through a bracket 58' attached to the mid-length of the second transverse member 29 so as to prevent lateral motion of the screw 56'.

Since screw 56 has segments with threads of opposite rotation, with rotation of its first segment causes the tab 54, the block 51 and the picking frame A to move toward or away from the picking frame B and rotation of its second segment causes an equal and opposite motion of the tab 54', the block 50' and the picking frame B and rotation of its second segment causes an equal and opposite motion of the tab 54', the block 50' and the picking frame B. Similarly, since the screw 56' has segments with threads of opposite rotation, rotation of its first segment causes the tab 55, the block 53, and the picking frame A to move laterally with respect to picking frame B and rotation of its second segment causes the tab 55', the block 52', and the picking frame B to move laterally in an equal and opposite direction.

One end of the screw 56 extends through a bracket 59 mounted on the first transverse member 28 adjacent to the collar 24 and the screw 56 is rotated by rotating a handle 60 attached to this end of the screw 56. Similarly, one end of the screw 56' extends through a bracket 59' mounted on the second transverse member 29 adjacent to the collar 27 and the screw 56' is rotated by rotating a handle 60' attached to this end of the screw 56'.

Longitudinal motion of the picking frames A and B with respect to each other is provided by a longitudinal positioning mechanism comprising a tab 66 extending from the block 63, a tab 67 extending from the block 64, a tab 66' extending from the block 61', and a tab 67' extending from the block 62'; a two-segment screw 68 extending generally parallel to the second longitudinal member 31 through the tabs 66 and 67; and a two-segment screw 68' extending parallel to the third longitudinal member 30' through the tabs 66' and 67'. The screw 68 has a scored portion 69 between its two segments and this scored portion 69 extends through a bracket 70 fixedly attached to the mid-length of the second longitudinal member 31 so as to prevent longitudinal motion of the screw 68. Similarly, the screw 68' has a scored portion 69' and this scored portion 69' of the screw 68' extends through a bracket 70' attached to the mid-length of the third longitudinal member 30' so as to prevent longitudinal motion of the screw 68'.

The screw 68 is of conventional known type with rotation of its first segment causing the tab 66 and the block 63 to move toward or away from the first transverse member 28 and rotation of its second segment causing identical motion of the tab 67 and the block 64. Thus, rotation of the screw 68 will cause the picking frame A to move toward or away from the first transverse member 28. Similarly, the screw 68' is of conventional known type with rotation of its first segment causing the tab 66' and the block 61' to move toward and away from the first transverse member 28 and rotation of its second segment causing identical motion of the tabs 67' and the block 62' with respect to the first transverse member 28. Thus, rotation of the screw 68' causes the picking frame B to move toward and away from the first transverse member 28.

One end of the screw 68 is extended through a bracket 71 mounted on the second longitudinal member 31 adjacent to the block 51 and the screw 68 is rotated by rotating a handle 72 attached to this end of the screw 68. Similarly, one end of the screw 68' is extended through a bracket 71' mounted on the third longitudinal member 30' adjacent to the block 50' and the screw 68' is rotated by rotating a handle 72' attached to this end of the screw 68'. Thus, the positions of the picking frames A and B are vertically adjustable by changing the position of the carriage D with the windlass 33 and the windlass 33', laterally adjustable by rotating the handle 60 and the handle 60′, and longitudinally adjustable by rotating the handle 72 and the handle 72′.

The right picking frame A and the left picking frame B are substantially mirror images of each other and the detailed description to follow will be restricted to the right picking frame A. However, the part of the left picking frame B corresponding to each part of the right picking frame A described is indicated in the drawings by the prime of the reference number used for the right picking frame A and the construction of the left picking frame B will be readily understood from the description of the right picking frame A.

The right picking frame A has a lower frame member 73 at one side and a lower frame member 74 at its other side. A lateral member 75 extends between one end of the lower frame member 73 and the corresponding end of the lower frame member 74 and a lateral member 76 extends between the other end of the lower frame member 73 and the corresponding end of the lower frame member 74. It is to the lower frame member 73 that the blocks 61 and 62 are fixedly attached and it is to the lower frame member 74 that the blocks 63 and 64 are fixedly attached. Thus, the lower frame members 73 and 74 and the lateral members 75 and 76 form a rectangular base which is vertically movable with the transverse members 28 and 29, laterally movable along the transverse members 28 and 29, and horizontally movable along the longitudinal members 30 and 31.

Extending vertically from the intersection of the lateral member 75 and the lower frame member 73 is a vertical member 77 and extending vertically from the other end of the lateral member 75 is a vertical member 78. An upper member 81 extends between the extending end of the vertical member 77 and the extending end of the vertical member 78 parallel to the lateral member 75. This upper member 81, the lateral member 75, the vertical member 77, and the vertical member 78 form a rectangular frame generally perpendicular to the rectangular frame formed by the lower frame member 73, the lower frame member 74, the lateral member 75, and the lateral member 76.

Extending vertically from the intersection of the lower frame member 73 and the lateral member 76 is a vertical member 79 and extending vertically from the other end of the lateral member 76 is a vertical member 80. An upper member 82 extends between the extending end of the vertical member 79 and the extending end of the vertical member 80 parallel to the lateral member 76. This upper member 82, the lateral member 76, the vertical member 79, and the vertical member 80 form a rectangular frame generally perpendicular to the rectangular frame formed by the lower frame member 73, the lower frame member 74, the lateral member 75 and the lateral member 76.

Extending parallel to the lower frame member 73 between the vertical members 77 and 79 is a first support member 83 and extending parallel to the lower frame member 74 between the vertical member 78 and the vertical member 80 is a second support member 84. The support members 83 and 84 are parallel to each other and lie in a plane of reference parallel to a plane of reference containing the lower frame members 73 and 74 and the lateral members 75 and 76. Thus, vertical, lateral, and longitudinal adjustment of the position of the frame A results in vertical, lateral, and longitudinal adjustment of the position of a reference plane containing the support members 83 and 84.

Positioned along the length of the support member 83 are four axle support brackets 85a, 85b, 85c and 85d and positioned along the length of the support member 84 are four axle support brackets 86a, 86b, 86c and 86d. Rotatably inserted through the axle support bracket 85a and the axle support bracket 86a is a first plate axle 87a, rotatably inserted through the axle support bracket 85b and the axle support bracket 86b is a second plate axle 87b, rotatably inserted through the axle support bracket 85c and the axle support bracket 86c is a third plate axle 87c, and rotatably inserted through the axle support bracket 85d and the axle support bracket 86d is a fourth plate axle 87d. The axle support brackets 85 and 86 are positioned so that the plate axles 87 are parallel to each other with their centerlines perpendicular to the support members 83 and 84, and more or less equally spaced between the vertical members 78 and 80.

The ends of the plate axles 87 extending beyond the support member 83 carry pulleys 88 and the ends of the plate axles 87 extending beyond the support member 84 carry circular plates 89. The number of circular plates 89 mounted in this manner on each of the frames A and B may be varied as desired. However, it has been found that four circular plates 89 on each frame provide good results. A first mounting plate 90 extends between the lower frame member 73 and the lower frame member 74 adjacent to the lateral member 75 and a second mounting plate 91 extends between the lower frame member 73 and the lower frame member 74 adjacent to the lateral member 76. A motor 92 is fixedly positioned on the first mounting plate 90. The motor 92 is an electrical motor of known type and has a gear reduction mechanism 93 of known type integrally associated with it. The drive shaft 94 of the gear reduction mechanism 93 carries a pulley 95 and operation of the motor 92 in known manner causes rotation of the pulley 95.

Similarly, the second mounting plate 91 has a motor 96 fixedly mounted on it. The motor 96 is an electrical motor of known type and has a gear reduction mechanism 97 of known type integrally associated with it. The drive shaft 98 of the gear reduction mechanism 97 carries a pulley 99 and operation of the motor 96 in known manner causes rotation of the pulley 99.

A belt 100 extends from the pulley 95 to and around the pulley 87a, thence to and around the pulley 87b and thence around the pulley 95 to its point of beginning. Similarly, a belt 101 extends from the pulley 99 to and around the pulley 87c, thence to and around the pulley 87d, thence to and around the pulley 99 to its point of beginning. When the motors 92 and 96 are driven in a clockwise direction as viewed in FIG. 2, this arrangement of the belts 100 and 101 causes all of the pulleys 85 to be rotated in a clockwise direction as viewed in FIG. 2. This clockwise rotation of the pulleys 85 causes a corresponding rotation in a clockwise direction, as viewed in FIG. 2, of the plates 89.

Each of the circular plates 89 has a substantially flat circular face 102 perpendicular to and concentric with the axis of rotation of the plate axle 87 on which the circular plate 89 is mounted. A plurality of elongated flexible rubber picking fingers 103 of known type are carried by each of the circular plates 89. The ends or bases of the picking fingers 103 are inserted into the face 102 of each of the circular plates 89 in the same manner as they are customarily inserted into the surfaces of the rotary drums used in previous chicken picking machines as seen in Patent 2,694,829 of Johnson. When a circular plate 89 is not rotating, the free ends and bodies of the picking fingers 103 extend from the face 102 of each of the circular plates 89 perpendicular to the face 102 of the circular plate 89 and transversely of the path of travel of a chicken or other fowl between the picking frames A and B.

The number of picking fingers 103 on each plate 89 may vary. However, in the specific embodiment of the invention described herein, there are sixteen picking fingers 103 on each of the plates 89 and on each plate 89 the picking fingers 103 are arranged in two circles. Eight picking fingers 103 are equidistantly spaced along an outer circle concentric with the axis of rotation and near the outer edge 105 of each of the plates 89 and eight picking fingers 103 are equidistantly spaced along an iner circle concentric with and near the axis of rotation of each of the plates 89. On each plate 89, the eight picking fingers 103 in the outer circle are angularly displaced with respect to the eight picking fingers 103 in the inner circle concentric with and near the axis of rotation of the plate 89 to the sixteen picking fingers 103 are all separated by an equal number of degrees. The sixteen picking fingers 103 on each plate 89 are constructed in known manner to be flexible only in a single plane and the picking fingers 103 are positioned in the outer and inner circles so as to be flexible toward and away from the axis of plate 89 rotation.

Operation

Figure 2:
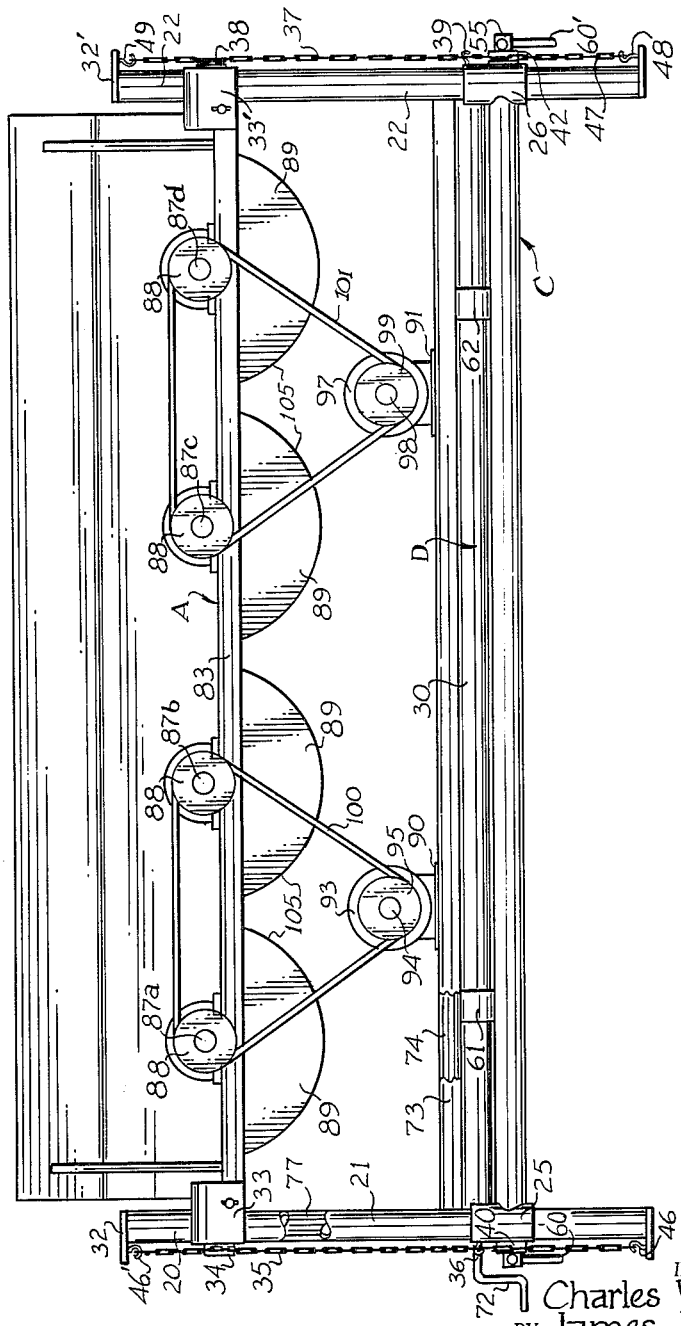
FIG. 2 is a side elevational view of the chicken picking machine showing that side of the right picking frame most remote from the path of a chicken through the machine.
Figure 3:
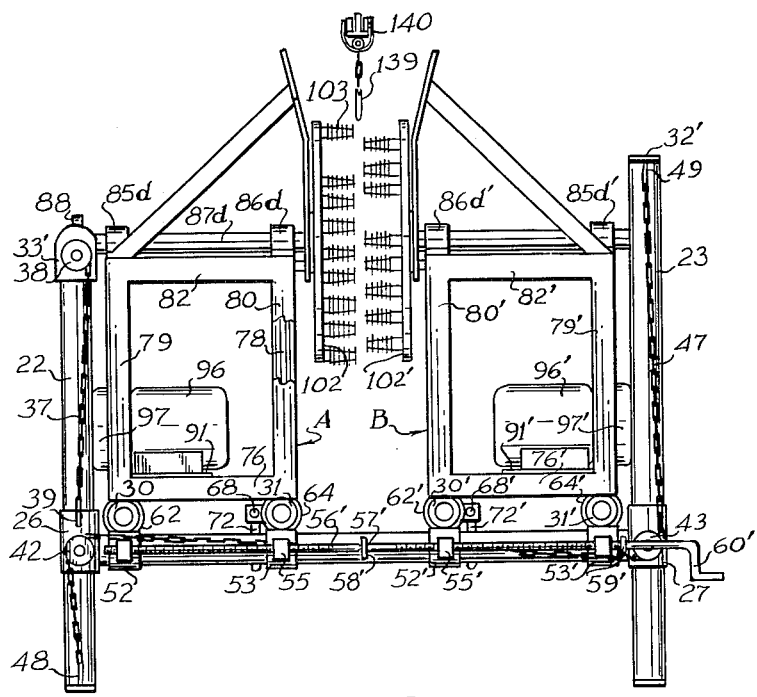
FIG. 3 is an elevational view of the chicken picking machine showing the two picking frames mounted on the vertically adjustable carriage.

The motors 92 and 96 of the right picking frame A drive the plates 89 in a clockwise direction as viewed in FIG. 2 and the motors 92', and 96' of the left picking frame B are arranged to drive the circular plates 89' in the same clockwise direction if viewed from the orientation of FIGURE 2. Since the circular plates 89 face the circular plates 89' on opposite sides of a chicken passing between the frames A and B along a line of motion 134, this rotational motion of the plates 89 and 89' results in the chicken being engaged on both sides by picking fingers 103 moving near the top of the frames A and B in the same direction as the chicken is moving and moving near the bottom of the frames A and B in a direction opposite to the direction the chicken is moving. It can be seen from the drawing that the axis of rotation of each plate is directed through the path of travel of the chicken.

Figures 6, 7:
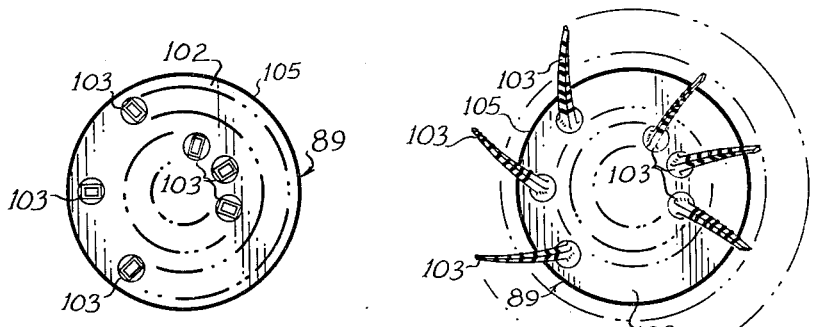
FIG. 6 is a front elevational view of one of the plurality of circular plates showing the orientation of the plurality of flexible rubber picking fingers when the circular plate is not being rotated.
FIG. 7 is a front elevational view of one of the plurality of circular plates showing the orientation of the plurality of flexible rubber picking fingers when the circular plate is being rotated.
Figure 4:
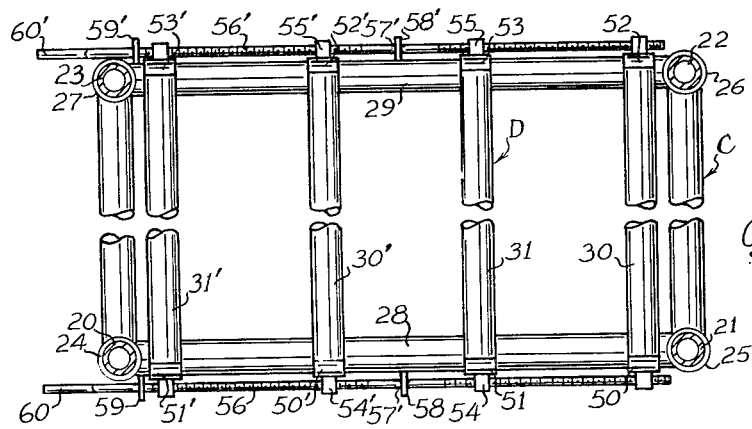
FIG. 4 is a fragmentary top plan view of the lateral positioning mechanism for the two frames.
Figure 5:
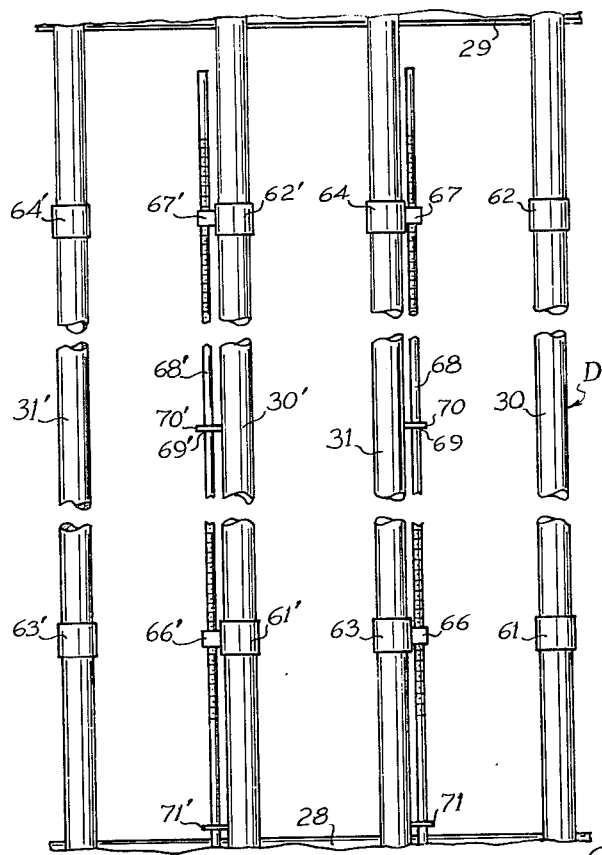
FIG. 5 is a fragmentary top plan view of the longitudinal positioning mechanism for the two frames.

Thus, when a chicken suspended head lowermost from a shackle 139 carried by a conveyor belt 140 of conventional known type passes between the right picking frame A and the left picking frame B along the line motion 134 indicated in FIG. 1, that portion of its body nearest the shackle 139 is engaged by picking fingers 103 moving in its direction of motion and downward and that portion most remote from the shackle 139 is engaged by picking fingers moving opposite to its direction of travel and upward. Moreover, as the circular plates 89 and 89' rotate, the picking fingers 103 bend away from the axes of rotation of the circular plates 89 and 89' because of centrifugal force. This results in a picking finger 103 configuration similar to that shown in dashed outline in FIG. 7. From FIG. 7 it will be seen that the flexible rubber picking fingers 103 rotate in orbital paths or circles concentric with the axes of rotation of the circular plates 89 and 89' and that because of centrifugal force the flexible rubber picking fingers 103 orient themselves across the concentric circle in which each picking finger 103 rotates. As a result, the body of a chicken carried between the picking frames A and B is engaged by the bodies of the picking fingers 103 as the bodies of the picking fingers 103 move with a lateral or sidewise wiping motion.

Moreover, the outward motion of the picking fingers 103 as a result of centrifugal force and the angular motion of the picking fingers 103 as a result of the rotation of the circular plates 89 and 89' causes the body of a chicken carried between the frames A and B along the line of motion 134 to be engaged by picking fingers 103 having those components of force along the arc of a circle already described and resulting from the rotational direction of the plates 89 and 89' and an additional component of force resulting from centrifugal force. The picking fingers 103 carried by each circular plate 89 or 89' define a picking area large enough to engage the major portion of one side of a chicken's body and it has been found that these components of picking finger 103 force will completely remove all feathers from all portions of a chicken's body.

It will be obvious to those skilled in the art that many variations may be made in the embodiments here chosen for the purposes of illustrating the present invention without departing from the scope thereof as defined by the appended claims.

What is claimed as invention is:

1. In a poultry picking machine, a main frame; a pair of picking frames supported on the said main frame, means for vertically adjusting said picking frames at each end, means for independently laterally adjusting the distance between said picking frames, and means for independently longitudinally adjusting the said picking frames with respect to each other; a series of circular plates rotatably mounted on each of said picking frames with the faces of the circular plates on one picking frame parallel to the faces of the circular plates on the other picking frame; means mounted on each of said picking frames for driving the circular plates on the said picking frames in the same rotational direction; and flexible picking fingers extending from the faces of the said circular plates for picking feathers from poultry passed between the said picking frames.

2. In a poultry picking machine, a picking frame, a plurality of finger supports mounted on said picking frame and rotatable about axes of rotation oriented toward poultry carried along a predetermined path, means for rotating said plurality of finger supports about their axes of rotation, flexible fingers mounted on each of said finger supports and bendable away from the axis of rotation of each of said finger supports by centrifugal force to engage said poultry while oriented across a circle concentric with said axis for picking feathers from poultry carried along the said predetermined path.

3. In a fowl picking machine through which fowl are conveyed along a path, a plurality of support members disposed along and adjacent said path and rotating about axes oriented through said path, and a plurality of flexible picking fingers mounted on said support members and moving adjacent said path in circles concentric with said axes, each of said picking fingers being bendable by centrifugal force to engage a fowl in said path with a laterally moving portion thereof.

4. In a fowl picking machine through which fowl are conveyed along a path, a plurality of support members disposed along and adjacent said path and rotating about axes oriented through said path, and a plurality of flexible picking fingers mounted on said support members and moving adjacent said path in circles concentric with said axes, each of said picking fingers being bendable by centrifugal force to engage a fowl in said path with a length thereof oriented acros the concentric circle in which said picking finger moves.

5. In apparatus for picking the feathers from fowl, a frame, means for moving said fowl into and out of said frame, elongated flexible fowl picking means spaced apart within said frame and having ends, and means for moving said picking means in said frame for engaging said fowl with a sidewise motion of said picking means such that the body of said picking means intermediate the ends of said picking means engages said fowl.

6. In apparatus for picking feathers from poultry wherein a plurality of fowl having feathers thereon are suspended in spaced relationship to each other and are successively moved along a path of travel through a picking frame, the combination therewith of a plurality of elongated flexible poultry picking fingers within said frame and projecting toward said path of travel, and means for moving said picking fingers in orbital paths adjacent said path of travel for engaging said fowl laterally of the body of each of said picking fingers intermediate the ends thereof with a sidewise movement.

7. In a chicken picking machine, a pair of oppositely facing rotatively driven picking finger support means, a plurality of flexible picking fingers carried by each of said support means, said flexible picking fingers of each support means being constructed to flare out from the axis of rotation of said support means to define a picking area, each of said support means having an axis of rotation extending through its picking area, means for suspending a chicken into said picking area, the picking area of each said support means being sized to cover the major portion of one side of the body of a chicken suspended therein.

8. In apparatus for picking poultry of the type wherein a plurality of fowl having feathers theron are suspended in spaced relationship to each other and are successively moved along a path of travel through a picking frame, the combination therewith of a plurality of elongated flexible fingers spaced apart and having bases by which said fingers are supported, means on said frame for carrying said fingers by their bases with the free ends of said fingers protruding toward said path of travel for disposing said fingers transversely of the path of travel of said fowl and at a height for engaging said fowl, means for moving said bases in orbital paths approximately parallel to the path of travel of said fowl and at a speed for imparting sufficient centrifugal force to said fingers to bend said fingers outwardly to present portions of the bodies of said fingers between said bases and said free ends to said fowl with a sidewise motion of said fingers for removing the feathers from said fowl.

References Cited by the Examiner

UNITED STATES PATENTS

| | | | |
|---|---|---|---|
| 2,444,556 | 6/48 | Drews | 17—11.1 |
| 2,556,509 | 6/51 | Thomson | 130—31 X |
| 2,560,524 | 7/51 | Johnson | 17—11.1 |
| 2,571,034 | 10/51 | Harvey | 17—11.1 |
| 3,044,108 | 7/62 | De Long | 17—11.1 |

SAMUEL KOREN, *Primary Examiner.*

LUCIE H. LAUDENSLAGER, *Examiner.*